US012195950B2

(12) United States Patent
Knapp et al.

(10) Patent No.: US 12,195,950 B2
(45) Date of Patent: Jan. 14, 2025

(54) MOBILE WORK MACHINE

(71) Applicant: LIEBHERR-WERK BISCHOFSHOFEN GMBH, Bischofshofen (AT)

(72) Inventors: Hans Knapp, Bischofshofen (AT); Josef Stock, Bischofshofen (AT); Rupert Gappmaier, Altenmarkt (AT); Christoph Kiegerl, Werfenweng (AT); Reinhard Windhofer, Muhlbach am Hochkonig (AT); Florian Altenberger, Taxenbach (AT)

(73) Assignee: LIEBHERR-WERK BISCHOFSHOFEN GMBH, Bischofshofen (AT)

( * ) Notice: Subject to any disclaimer, the term of this patent is extended or adjusted under 35 U.S.C. 154(b) by 0 days.

(21) Appl. No.: 17/620,131

(22) PCT Filed: Jun. 25, 2020

(86) PCT No.: PCT/EP2020/067808
§ 371 (c)(1),
(2) Date: Dec. 17, 2021

(87) PCT Pub. No.: WO2020/260450
PCT Pub. Date: Dec. 30, 2020

(65) Prior Publication Data

US 2022/0251804 A1 Aug. 11, 2022

(30) Foreign Application Priority Data

Jun. 25, 2019 (DE) ..................... 10 2019 117 118.0

(51) Int. Cl.
*E02F 9/22* (2006.01)
*F15B 11/04* (2006.01)
*E02F 3/42* (2006.01)

(52) U.S. Cl.
CPC .......... *E02F 9/2203* (2013.01); *E02F 9/2271* (2013.01); *F15B 11/04* (2013.01);
(Continued)

(58) Field of Classification Search
CPC ........ F15B 2013/008; F15B 2211/6313; E02F 9/2203; E02F 9/2271
See application file for complete search history.

(56) References Cited

U.S. PATENT DOCUMENTS 6,397,890 B1 * 6/2002 Mickelson .............. F16K 11/07 137/625.69
2017/0121944 A1 * 5/2017 Kajita ................... E02F 9/2242
(Continued)

FOREIGN PATENT DOCUMENTS

DE 102006002920 A1 7/2007
DE 112016000086 T5 * 3/2018 .............. F16K 11/07

OTHER PUBLICATIONS

International Search Report and Written Opinion (with English translation of International Search Report) issued in corresponding International Patent Application No. PCT/EP2020/067808 dated Oct. 2, 2020 (11 pages).

*Primary Examiner* — Abiy Teka
(74) *Attorney, Agent, or Firm* — Kilyk & Bowersox, P.L.L.C.

(57) ABSTRACT

The present invention relates to a mobile work machine, in particular to a wheeled loader, having a hydraulic circuit, having a pump for conveying a hydraulic medium through the hydraulic circuit, and having at least one control block having an inflow control edge and an outflow control edge for controlling the flow of the hydraulic medium, wherein the work machine has a working tool and a cylinder for actuating the working tool and wherein the cylinder has an outflow and in inflow for the hydraulic medium, and wherein the outflow is in fluid communication with the outflow
(Continued)

Figure 1:
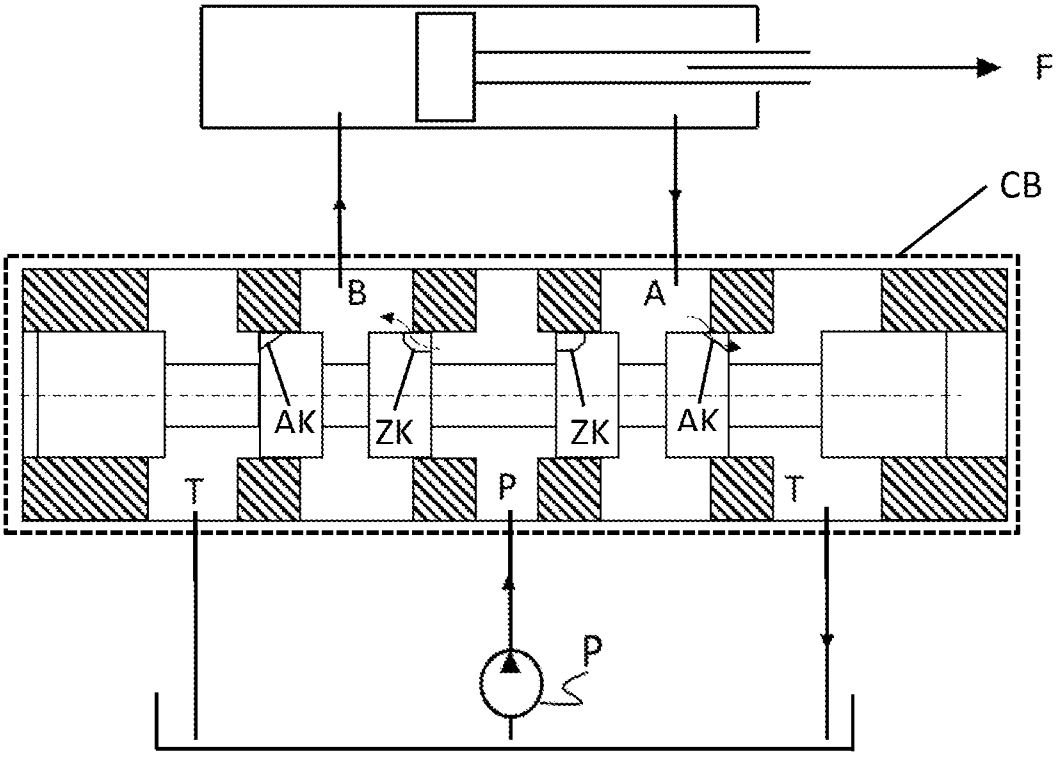

control edge and the inflow is in fluid communication with the inflow control edge, and wherein the inflow control edge does not have any or has fewer fine control notches than the outflow control edge and thus works in a largely unrestricted manner, while the outflow control edge is equipped with one or more fine control notches so that with a pulling load at the working tool, the outflow control edge restricts the outflow amount through the outflow of the cylinder.

6 Claims, 3 Drawing Sheets

(52) U.S. Cl.
CPC ......... *E02F 3/422* (2013.01); *F15B 2211/426* (2013.01); *F15B 2211/6313* (2013.01)

(56) References Cited

U.S. PATENT DOCUMENTS

2018/0163888 A1 6/2018 Ishikawa et al.
2021/0310570 A1* 10/2021 Kashid ................ F15B 13/0402

* cited by examiner

MOBILE WORK MACHINE

This application is a National Stage Application of PCT/EP2020/067808, filed Jun. 25, 2020, which claims priority to German Patent Application No. 10 2019 117 118.0, filed Jun. 25, 2019.

The present invention relates to a mobile work machine, in particular to a wheeled loader, having a hydraulic circuit that is preferably open, having a pump for conveying a hydraulic medium through the hydraulic circuit, and having at least one control block having an inflow control edge and an outflow control edge for controlling the flow of the hydraulic medium, wherein the work machine has a working tool and a cylinder for actuating the working tool, and wherein the cylinder has an outflow and an inflow for the hydraulic medium, with the outflow being in fluid communication with the outflow control edge and the inflow being in fluid communication with the inflow control edge of the control block.

It is known from the prior art to operate cylinder drives for work machines, such as for wheeled loaders, having pumps in an open circuit in conjunction with control blocks in hydraulic regulating systems. This preferably applies to wheeled loaders having LS (load sensing) systems. A substantial energy expenditure is required for this regulation. If a plurality of consumers are supplied by the pump, losses due to different load pressures also arise since the pump always has to generate the total conveying flow with the pressure of the consumer having the highest load pressure to ensure its function.

It is conceivable to use a plurality of pumps that make it possible to generate a plurality of pressures. It should be achieved by a variable allocation of piston groups for different consumers that the pumps supply the required oil amount having the individually associated pressure for every consumer at all times. This makes a pure displacement control of the consumers possible, i.e. the pumps convey the respectively required amount without a hydraulic regulation by an electrical specification of this amount. Losses for different load pressures and for the regulation are thereby avoided and the energy efficiency of the work machine is increased.

A desired amount for pressing loads such as on the raising of the bucket of the wheeled loader is determined from the operator input in the form of the operating lever distance or the like. This is forwarded to the pump that then provides the conveying amount. The LS regulation effort is dispensed with. The control block is completely opened and no longer participates in the amount allocation.

It is the underlying object of the present invention to further develop a work machine of the initially named kind such that it works particularly efficiently.

This object is achieved by a work machine having the features of claim 1.

Provision is accordingly made that the inflow control edge does not have any or has fewer fine control notches than the outflow control edge that is equipped with one or more fine control notches so that the outflow control edge restricts the outflow amount through the outflow of the cylinder on a pulling load on the working tool.

With a pulling load such as on the tilting of the bucket of a wheeled loader beyond the tipping point, the cylinder is pulled by the load, i.e. the cylinder is moved by the external force.

In this case, the amount control for the hydraulic medium, in particular oil, is taken over by the control block. The latter partially closes the outflow control edge of the control block in accordance with the desired movement speed of the working tool that is specified e.g. by the distance of the operator operating lever and in this manner restricts the outflow amount from the cylinder.

It is pointed out at this point that the term "cylinder" generally stands for one or more piston-in-cylinder units, with the piston being movably received in the cylinder space and dividing it into at least two part regions of which one has the outflow and one the inflow.

One or more sensors that sense the pressure conditions can be provided.

A certain minimum pressure is maintained on the oppositely disposed side, i.e. in the region of the volume of the cylinder that increases with a pulling load, so that the volume increase produced by the pulling out of the cylinder is filled. The amount is metered in almost without loss via the fully opened control edge in the control block.

A pressure regulator can be provided that cooperates with the pump such that the minimum pressure is maintained on the cylinder side on which a volume increase is produced by the pulling load.

It can be an electrically adjustable pressure regulator of the pump here.

A control can be provided that is configured to control or to regulate the movement of the control block or blocks.

The control block preferably has an inflow control and an outflow control. The inflow, however, is controlled in accordance with the invention by the conveying amount of the pump and thus preferably does not have any fine control notch and opens fast from the middle position and up to the full cross-section. A control can be present that is configured to control or to regulate the conveying amount of the pump through the inflow.

In contrast, the outflow side at the control block has the full functionality of a classical control block and accordingly has one or more fine control notches and possibly reduced cross-sections.

In accordance with the invention, a classical control block can thus be used whose inflow control edges are completely unrestricted. The function is restricted to the allocation to the respective cylinder side (change of the direction of movement) and the possibly required outflow restriction.

The outflow control edge and the inflow control edge can be combined in a control block or arranged in a dispersed construction, i.e. in separate control blocks.

In a further embodiment of the invention, the work machine has a main consumer and a secondary consumer, with a control being present that is configured so that on a pulling load at the working tool and on a smaller load pressure of the secondary consumer than of the main consumer, the outflow control edge of the main consumer closes so much that pressure is backed up that is sufficient to actuate the secondary consumer. This can also be done by a suitable control.

The main supplies are preferably also used for subordinate additional functions. The stroke supply could, for example, tip out a tip-up bucket or the tilt supply could act on a holding-down device, whereby construction effort is saved. These functions are called the 3rd or possibly 4th control circuit, etc. that typically have their own sliders.

If a pressure level supplies different consumers, the problem arises that the consumer having the lowest load pressure consumes a main portion of the amount and the consumer having the highest load pressure remains stationary since the oil or the hydraulic medium always chooses the path of least resistance. In the prior art, these pressure differences are eliminated via deadweight gauges and the desired movement speed is thus set by restriction. The pump delivers the highest load pressure with the total amount.

To keep the construction effort small, the 3rd and optionally 4th control circuits are combined with the hydraulic circuit in accordance with claim 1.

The following cases can occur here:

the load pressure in the 3rd and optionally 4th control circuits is smaller than the main function; a deadweight gauge at the 3rd or 4th control circuits backs up the pressure so much by feeding back the high load pressure from the main function such that the main function does not remain stationary as is known from the prior art.

In the second case, the load pressure in the 3rd and optionally 4th control circuits Is higher than that of the main function, i.e. the load pressure of the secondary consumer is higher than that of the main consumer. To achieve that the secondary consumer or consumers do not become stationary, the outflow control edge of the main consumer or of the control block of the main consumer is closed so much in accordance with the invention with a pulling load that sufficient pressure is built up for the 3rd and optionally 4th control circuits and the secondary consumer is moved.

The advantage is that no additional components are required and the full energetic advantage can be used as long as the main function alone is used.

It is pointed out at this point that the terms "a" and "one" do not necessarily refer to exactly one of the elements, even though this represents a possible embodiment, but can also designate a plurality of elements. The use of the plural equally also includes the presence of the element in question in the singular and, conversely, the singular also includes a plurality of the elements in question.

Figure 2:
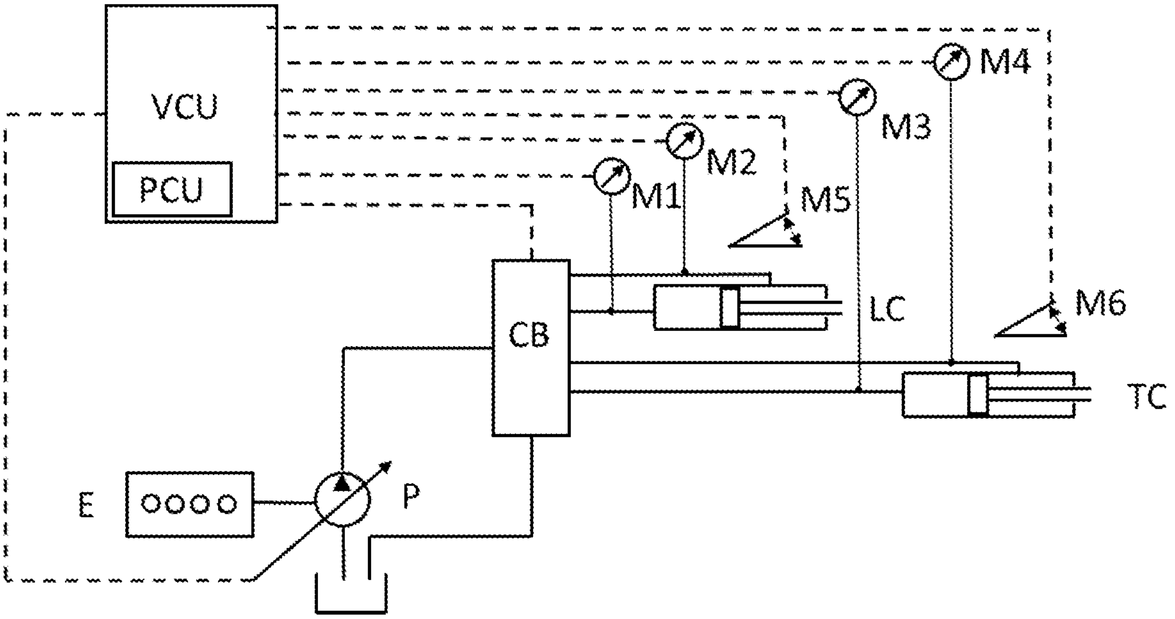
Figure 3:
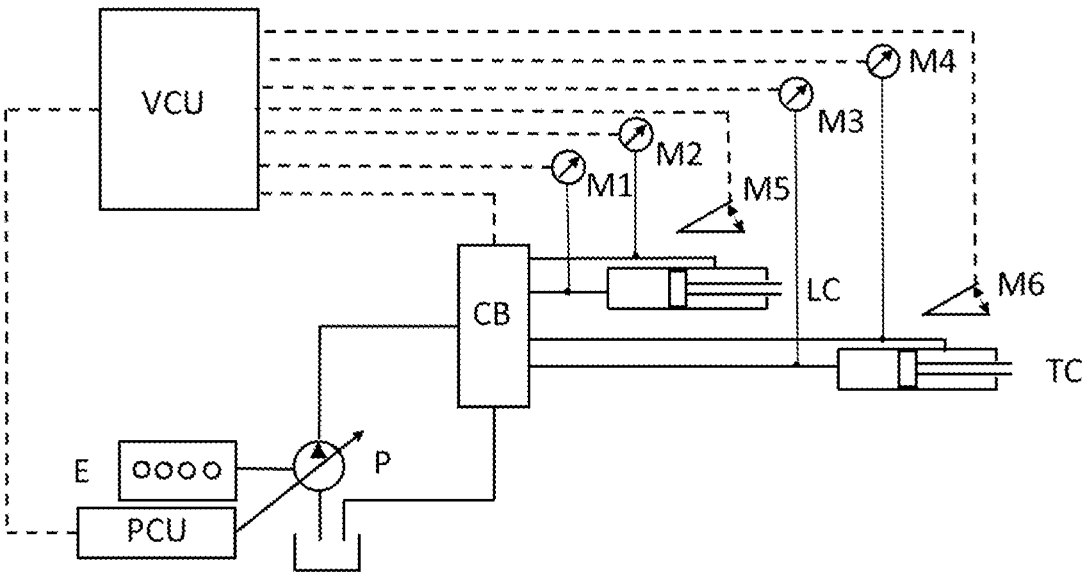

Further details and advantages of the invention will be explained in more detail with reference to an embodiment described in the following. There are shown:

FIG. 1: a schematic representation of the hydraulic circuit with the differently formed inflow and outflow control edges of a control block;

FIG. 2: a schematic representation of an interconnection of a lifting cylinder and a tilting cylinder for a bucket of a work machine; and FIG. 3: a further schematic representation of an interconnection of a lifting cylinder and a tilting cylinder for a bucket of a work machine.

If the tipping point of the bucket is exceeded with a wheeled loader, the bucket pulls the tilt cylinder, i.e. the tilt cylinder is moved by the bucket.

The quantity control is now taken over by the control block that partly closes, i.e. restricts, the cylinder outflow control edge in accordance with the desired movement speed so that the outflow amount and thus the movement speed of the bucket and of the cylinder can be set.

On the other side, i.e. on the side of the increasing cylinder space, an electrically adjustable pressure regulator of the pump provides that a minimum pressure is maintained so that the volume produced by the pulling out of the cylinder is filled. This is done with a completely opened inflow edge of the control block.

The inflow is controlled by the conveying amount of the pump and thus does not have any fine control notch. In contrast, the outflow edge of the control block is provided with a fine control notch so that the outflow speed is settable.

It is pointed out at this point that the term "fine control notch" dies not only designate a fine control notch per se, but rather stands as representative for any desired restriction member.

FIG. 1 shows a schematic representation of the hydraulic circuit with the differently formed inflow control edges ZK and outflow control edges AK of a control block CB.

The control block CB is here connected to the pressure side of the pump P, to a tank T for hydraulic medium, and to the base side and the rod side of a cylinder. The control block CB here regulates the inflow and outflow of a hydraulic medium present in the cylinder in that the cylinder reservoir at the base side B or at the rod side A can be fluidically connected to the pressure side of the pump or to the tank via adjustable restriction units, the so-called inflow edges ZK and outflow edges AK respectively.

If now a pulling force acting on the cylinder is produced, the object arises of ensuring the continuous and unchanging cylinder movement by a targeted restriction of the outflow edge. One unwanted effect here could be the occurrence of a movement that differs greatly from the operator input.

Such an unwanted effect can be adopted for the example of a wheeled loader when a wheeled loader bucket has exceeded its tipping point during the tipping out and the previously pressing cylinder becomes a pulled cylinder due to the weight force of the bucket and of the load located thereon. In other words, the bucket that now tilts down on its own pulls the cylinder out (by the force F shown in FIG. 1); the oil conveying amount of the pump to the inflow side (edge) practically no longer plays any role for the controllability and the movement has to be metered via the outflow side (edge).

It is ensured by the present invention through the design of the outflow edge AK and of the inflow edge ZK in the control block CB that a sufficiently high pressure is also present on the outflow side of the consumer (cylinder) in such a state.

In FIG. 1, the inflow control edge ZK into the reservoir of the cylinder at the base side has a shape by which a large amount of area us abruptly made free so that an unrestricted inflow from the pump P can flow into the reservoir B of the cylinder at the base side.

It is different with the outflow of the hydraulic medium from the reservoir A of the cylinder at the rod side since here the outflow edge AK has a restricting function that can be provided, for example, by a linear progression of the edge. The pressure, on the rod side M4, for example, can thereby be built up effectively and in an easily meterable manner by small changes in the slider position. A clean movement behavior can hereby also be ensured for conveying situations despite the loss-optimized inflow edge.

For easier understanding, the direction of flow of the hydraulic medium is represented by arrows in FIG. 1.

FIG. 2 here shows the exemplary embedding of the control block CB for controlling a working tool.

The drive of the adjustable hydraulic pump P takes place mechanically here by an engine or motor, for example an internal combustion engine or an electric motor E.

Hydraulic fluid is supplied to the hydraulic control block CB via the pump P. The position of the control piston in the control block CB (in accordance with FIG. 1) is set via a control unit VCU, in an exemplary manner via electrohydraulic pilot valves (not shown). Depending on the control piston position, the corresponding hydraulic fluid amount is discharged to respective hydraulic cylinders of the working tool LC, TC and thus produces the desired movement of, for example, the lifting arm and/or the bucket/fork of the work machine.

The control slider adjustment is taken over by the control unit VCU. For this purpose, the input values M1, M2 for the cylinder pressure of the base side and rod side of the cylinder and M5, for example the angle of rotation are read into the control unit VCU by a rotary encoder of the lifting cylinder LC that is arranged at the lifting arm, for example. It is pointed out that different position sensing systems could also be used in the kinematics of the work machine aside from a rotary encoder. For this purpose, the input values M3, M4 for the cylinder pressure of the base side and rod side of the cylinder and M6, for example the angle of rotation are read into the control unit VCU by a rotary encoder of the tilting cylinder TC, arranged at the deflection lever, for example.

The evaluation of whether a pulling or pushing load is applied takes place by the evaluation of the lifting/tilting movement via corresponding angle of rotation sensors in combination with the determined cylinder pressures. An adjustment of the control piston in accordance with a stored valve characteristic takes place. Pressing load means that the effective direction of hydraulic pressure in the cylinder (resultant from the cylinder pressure at the base and rod sides) and the direction of movement of the cylinder go in the same direction. Pulling load means that the effective direction of hydraulic pressure in the cylinder (resultant from the cylinder pressure at the base and rod sides) and the direction of movement of the cylinder go in the opposite direction.

The pump pressure regulator PCU of the pump can be both by a separate component and integrated in the VCU.

FIG. 3 shows a pump control unit PCU that is configured as a separate component.

REFERENCE NUMERAL LIST

VCU vehicle control unit
PCU pump control unit
CB control block
E engine/motor
M1 pressure sensor LC lift cylinder-base pressure
M2 pressure sensor LC ram pressure
M3 pressure sensor TC tilt cylinder-base pressure
M4 pressure sensor TC rod pressure
M5 angle sensor LC
M6 angle sensor TC
P pump
AK outflow edge
ZK inflow edge
A reservoir at the rod side
B reservoir at the base side
T tank
F pulling force on the cylinder piston

The invention claimed is:

1. A mobile work machine, comprising a hydraulic circuit, having a pump for conveying a hydraulic medium through the hydraulic circuit, and having at least one control block having a first inflow control edge, a second inflow control edge, a first outflow control edge, and a second outflow control edge for controlling the flow of the hydraulic medium, wherein the work machine has at least one working tool, a main cylinder for actuating the at least one working tool, and a secondary cylinder, and wherein the main cylinder and the secondary cylinder each have an outflow and an inflow for the hydraulic medium, respectively, and wherein the outflow of the main cylinder is in fluid communication with the first outflow control edge, the outflow of the secondary cylinder is in fluid communication with the second outflow control edge, the inflow of the main cylinder is in fluid communication with the first inflow control edge, and the inflow of the secondary cylinder is in fluid communication with the second inflow control edge, wherein the first inflow control edge does not have any or has fewer fine control notches than the first outflow control edge and thus works in a largely unrestricted manner, while the first outflow control edge is equipped with one or more fine control notches so that with a pulling load at the at least one working tool, the first outflow control edge restricts the outflow amount through the outflow of the main cylinder, wherein a pressure regulator is provided that cooperates with the pump such that a minimum pressure is maintained on a cylinder side of the main cylinder and the secondary cylinder on which a volume increase is produced by the pulling load, wherein a control is present that is configured so that on a higher pulling load of the secondary cylinder than of the main cylinder, the first outflow control edge of the main cylinder closes so much that pressure is backed up that is sufficient to actuate the secondary cylinder.

2. The mobile work machine in accordance with claim 1, wherein a movement control is provided that is configured to control the movement of the at least one control block.

3. The mobile work machine in accordance with claim 1, wherein a pump control is provided that is configured to control the conveying amount through the pump.

4. The mobile work machine in accordance with claim 1, wherein the pressure regulator is an electrically adjustable pressure regulator of the pump.

5. The mobile work machine in accordance with claim 1, wherein the first outflow control edge, the second outflow control edge, the first inflow control edge, and the second inflow control edge are combined in one control block of the at least one control block or the first outflow control edge and the first inflow control edge are combined in a first control block and the second outflow control edge and the second inflow control edge are combined in a second control block.

6. A mobile work machine, comprising a hydraulic circuit, having a pump for conveying a hydraulic medium through the hydraulic circuit, and having at least one control block having an inflow control edge and an outflow control edge for controlling the flow of the hydraulic medium, wherein the work machine has a working tool and at least one cylinder for actuating the working tool and wherein the at least one cylinder has an outflow and an inflow for the hydraulic medium, and wherein the outflow is in fluid communication with the outflow control edge and the inflow is in fluid communication with the inflow control edge, wherein the inflow control edge does not have any or has fewer fine control notches than the outflow control edge and thus works in a largely unrestricted manner, while the outflow control edge is equipped with one or more fine control notches so that with a pulling load at the working tool, the outflow control edge restricts the outflow amount through the outflow of the at least one cylinder and further comprising a control, wherein the at least one cylinder comprises a lifting cylinder and a tilting cylinder, the control receives input values of the lifting cylinder and the tilting cylinder, and the lifting cylinder and the tilting cylinder are controlled by the control via one control block of the at least one control block, based on the input values.

* * * * *